310-369 SR
XR 3,523,200

Aug. 4, 1970 W. E. NEWELL 3,523,200

SURFACE WAVE PIEZOELECTRIC RESONATOR

Filed Feb. 28, 1968

WITNESSES:
Helen M. Farkas
Leo P. Johns

INVENTOR
William E. Newell

BY
Frederick Shapoe
ATTORNEY 3,523,200

SURFACE WAVE PIEZOELECTRIC RESONATOR

William E. Newell, Murrysville, Pa., assignor to Westinghouse Electric Corporation, Pittsburgh, Pa., a corporation of Pennsylvania Filed Feb. 28, 1968, Ser. No. 708,823
Int. Cl. H04r 17/00
U.S. Cl. 310—8.2 8 Claims

ABSTRACT OF THE DISCLOSURE

A piezoelectric resonator including a solid body of piezoelectric material and at least two transducer concentric electrodes for propagating and receiving surface energy in the body.

CROSS REFERENCE TO RELATED APPLICATION

This application is related in subject matter to copending application No. 708,824, issued Feb. 28, 1968.

BACKGROUND OF THE INVENTION

Field of the invention

This invention relates to devices exhibiting acoustic resonance such as piezoelectric resonators employed in microminiature circuits.

Description of the prior art

Conventional piezoelectric resonators are based on either longitudinal or shear waves which bounce back and forth between specific free boundaries of the material which act as reflectors. The waves may be planar, in which case the reflecting faces are also parallel planes, or the waves may be circular, in which case the reflecting face is also circular. In either case the acoustic energy is distributed throughout the body of the resonator. Mounting the resonator and making electric contact to it has involved a double faceted problem. First, if the resonator is touched anywhere except at the node, acoustic energy is lost from the resonator and the quality factor, Q, of the resonance decreases. Second, resonances in the mount or the leads may be excited, leading to unwanted resonances in the frequency response.

Acoustic waves may also be propagated along the surface of the solid such that almost none of the acoustic energy penetrates more than a few wave lengths into the material. These waves are known as Rayleigh waves in a semi-infinite solid, or Love waves in a solid of finite thickness. Although surface waves play a major role in earthquake phenomena and have been studied in this connection, no reference has been found to the use of surface waves in a resonant structure.

In electronic circuits if a transducer electrode is formed on top of a piezoelectric body of rectilinear configuration, a resonator is created because surface waves set up by the transducer reflect at the edges of the body. Since the waves propagate only on top of the bar, the quality factor, Q, of the resonator should not depend upon how the bottom surface of the body is supported.

Accordingly, it is a general object of this invention to provide a surface wave piezoelectric resonator for use in microminiature circuits.

It is another object of this invention to provide a surface wave piezoelectric resonator for use in a unitary structure with an integrated circuit.

Finally, it is an object of this invention to satisfy the foregoing objects and desiderata in a simple and expedient manner.

SUMMARY OF THE INVENTION

Generally, the surface wave piezoelectric resonator of the present invention comprises a body of piezoelectric material having a circular configuration, and transducer means on the surface of the body for propagating surface energy in the body in radial paths of travel equal to a whole integer of half a wavelength of the surface energy, and the transducer means including at least two electrode elements whcih are concentrically disposed with respect to the center of the body.

BRIEF DESCRIPTION OF THE DRAWINGS

For a better understanding of the invention reference is made to the following description together with the accompanying drawings, in which.

Similar numerals refer to similar parts throughout the several views of the drawing.

Figure 1:
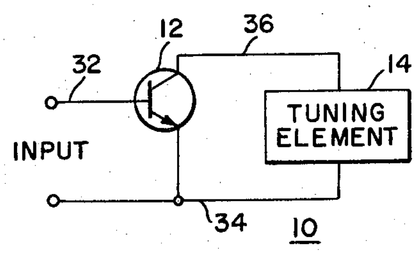
FIG. 1 is a schematic diagram of electric circuit elements that may be joined in accordance with the principles of the present invention.

The diagram of FIG. 1 illustrates a portion of a circuit 10 with elements intended to be integrated in a unitary structure. The circuit 10 includes a transistor amplifier 12 which is coupled to a tuning element 14. For clarity a conventional circuit for applying the necessary DC biases to the transistor amplifier 12 is not shown. The tuning element 14 provides frequency selectivity in the amplification of the amplifier 12 as, for example, is desired in the intermediate frequency amplifier stages of a superheterodyne radio receiver.

Figure 2:
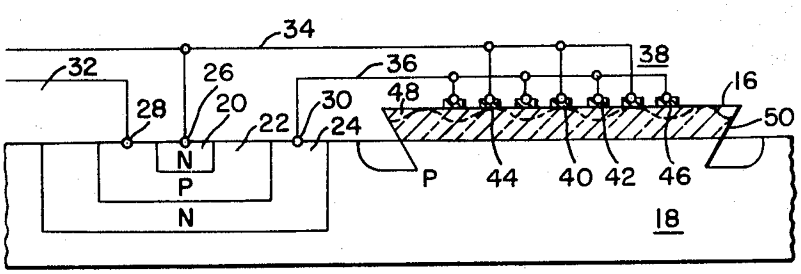
FIG. 2 is a sectional view of a fragmentary portion of an integrated circuit including a transistor amplifier that is electrically coupled to a piezoelectric resonator mounted on a substrate.

One form of the invention is illustrated in the structure of FIG. 2 in which the elements of FIG. 1 are physically integrated wherein a body or resonator 16 of piezoelectric material is mounted on a substrate 18 of a semi-conductor integrated circuit. The resonator 16 functions as a tuning element for a transistor amplifier structure which includes an emiter region 20, a base region 22, and a collector region 24 with ohmic contacts 26, 28, and 30 applied to the respective regions. Connection between the amplifier structure and the resonator 16 is provided by conductors 32, 34, and 36 as shown in FIGS. 1 and 2.

Figure 3:
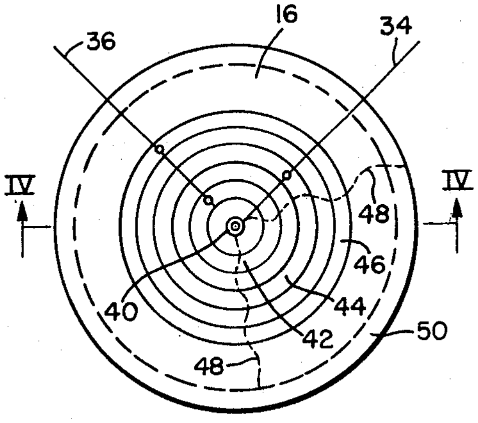
FIG. 3 is a schematic view of a disk-like piezoelectric body having concentric electrodes mounted thereon and lead wires therefor.

A surface wave is induced in the resonator 16 and the surface of substrate 18 by a transducer generally indicated at 38 (FIG. 2) which includes at least two electrodes, and preferably more electrode elements 40, 42, 44, and 46 of which elements 40 and 44 are of one polarity and of which the elements 42 and 46 are of another polarity. The more particular structure of the resonator 16 and the transducer is illustrated in FIG. 3. The resonator 16 is a circular member or disk composed of piezoelectric material such as quartz, rochelle salt, cadmium sulfide, or lead zirconate titanate. As is well known the pezoelectric effect is an interaction of mechanical and electrical stress-strain variables in a medium. Compression of a crystal of quartz generates an electrostatic voltage across it, and conversely, application of an electric field may cause the crystal to expand or contract in certain directions. An upper frequency limit to the fabrication and bonding of transducers is established by practical considerations at about 100 mHz. and the half wavelength thickness is about 25 microns (micrometers).

Figure 4:
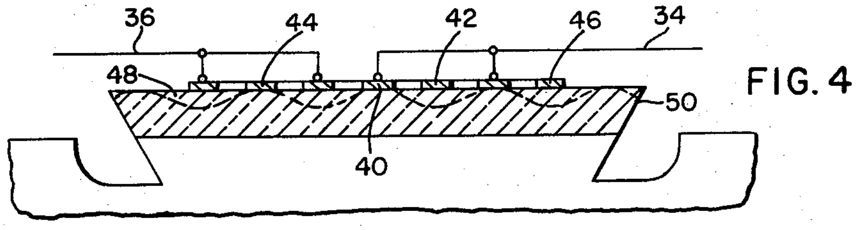
FIG. 4 is an enlarged vertical sectional view taken on the line IV—IV of FIG. 3.

For microminiature circuits a thin film resonator 16 is applied on a substrate 18 which is composed of semiconductor material such as P-type conductivity material. The resonator may be formed by deposition, such as by evaporation of a layer of piezoelectric material on the substrate by the use of a mask and photoresist techniques. As shown in FIGS. 3 and 4 the means for transducing or transmitting electrical energy into the resonator 16 is provided on one surface thereof. The means include the electrodes 40, 42, 44, and 46. All of the elements 40 to 46 are concentrically disposed with respect to the center of the disk-like resonator 16. The central element 40 may have a circular configuration with an open center or be of a dot-like shape disposed at the geographical center of the resonator 16. As shown in FIG. 3 the elements 40 and 44 are interconnected by the wire 34 and the elements 42 and 46 are interconnected by the wire 36. The former set of electrodes 40 and 44 have one polarity while the set of electrodes 42 and 46 have the opposite polarity. It is understood that although four elements 40, 42, 44, and 46 are shown more or less than four elements may be used.

The radius of the resonator 16 as well as the radius and spacing of the several elements 40 to 46 are dependent upon the wavelength of the surface energy induced into the resonator. As shown in FIGS. 3 and 4 the particular construction of concentrically disposed elements 40 to 46 set up radial waves generally indicated at 48 having a starting point at the center of the resonator 16, that is at the location of the electrode 40 and emanate radially therefrom in a 360° area toward the outer periphery of the resonator which is preferably inclined or beveled at 50 in order to obtain the optimum reflection of the radial waves 48 and return them to the center of the resonator. For that purpose also the spacing between the centers of the adjacent concentric elements 40, 42, 44, and 46 is equal to approximately one-half the wavelength of the surface energy induced by the transducer. As shown in FIG. 4 such spacing between the concentric elements places the elements at the nodes and anti-nodes of the induced wavelength.

The beveled edge portion 50 of the resonator improves the reflection of the surface energy waves and thereby minimizes energy leakage from the resonator as earlier disclosed in Soviet Physics, vol. 3, pp. 304–306, 1958. As a result the resonator has the general shape of a truncated cone.

The several elements 40 to 46 may be applied in any one of several ways such as by evaporation and the use of masks and photoresist techniques for the deposition of the electrodes which may be composed of any one of the metals such as copper, aluminum, gold, and nickel.

By way of further example to demonstrate a surface wave resonance and means for exciting it, a resonator was built using a disk of Clevite PZT–4 piezoelectric ceramic having a diameter of ½ inch and a thickness of 100 mils having silver electrodes. Using a mask and photoresist techniques one of the electrodes was etched to produce 18 parallel strips, each 7.5 mils wide and separated by gaps of 7.5 mils. Alternate stripes are interconnected to provide two sets of interconnected electrodes. The ceramic was then cut and sanded to obtain two flat edges parallel to each other and parallel to the stripes. These edges serve to reflect the acoustic wave with the proper phase. The resonator was then attached to a block of Micarta with a mixture of beeswax and rosin.

A test circuit was used to obtain the frequency response of the resonator. The frequency range covered was from 0 to 10 mc. A capacitive load was used in order to eliminate (as far as possible) the effect of the linearly increasing capactive admittance of the resonator.

The frequency response of the test circuit included a sharp downward spike at about 2.8 mc. with some other closely-spaced peaks from spurious resonances. The response of the test circuit was compared with a 350 pf. mica capacitor. The fundamental radial mode occurred at 455 kc. and was followed by many overtone modes. A major spurious mode occurred at the thickness resonant frequency of about 7 mc.

Accordingly, the device of the present invention provides a novel type of resonator using surface waves with an electrode pattern for propagating them in a radial pattern. One advantage of this type of device is that it offers a resonator which may be solidly mounted on the surface of a substrate without destroying the resonant response. Although electrical connection is disclosed as being made on the upper surface of the resonator, such connections may also be made on the opposite surface. Such a resonator is useful in the construction of a tuned functional block amplifier and can be constructed using photoresist techniques which are commonly available. Since the resonant frequency is determined by the electrode spacing, which can be made very small, it is possible to build high frequency resonators that are much more rugged than previously available.

It is, understood, however, that although resonators of circular configuration are stressed, resonators having other shapes such as polygonal and rectilinear, are included.

It is understood moreover, that the above specification and drawings are merely exemplary and not in limitation of the invention.

What is claimed is:

1. A surface wave piezoelectric resnoator for utilizing surface wave energy comprising a solid resonator body of piezoelectric material having a circular configuration, transducer means on the surface of the body for propagating acoustic energy in radial waves having nodes and antinodes across the surface zone of the body in response to electrical signals, the resonator body having surface wave reflecting means at the periphery of the body, the transducer means including at least two electrode elements which are concentrically disposed, the adjacent electrode elements being of opposite polarity, and the spacing between the electrodes being equal to approximately one-half the wavelength of the induced radial waves, whereby one electrode is disposed at the node and an adjacent electrode at the antinode of the wavelength.

2. The resonator construction of claim 1 in which the piezoelectric body has a radius equal to a whole integer of half a wavelength of the surface energy.

3. The resonator construction of claim 1 in which the outer peripheral surface of the body has the configuration of a truncated cone.

4. The resonator construction of claim 1 in which the transducer means includes at least two electrode elements, one of which is centrally disposed on the body.

5. The resonator construction of claim 1 wherein the transducer means comprises at least two electrodes on the same surface of said body of piezoelectric material.

6. The resonator construction of claim 1 wherein the body of piezoelectric material is solidly mounted on a substrate.

7. The resonator construction of claim 6 wherein said substrate is a semiconductor device.

8. The resonator construction of claim 6 wherein said substrate is an integrated circuit.

References Cited

UNITED STATES PATENTS

| | | | |
|---|---|---|---|
| Re. 23,813 | 4/1954 | Adler | 310—9.7 X |
| 2,943,278 | 6/1960 | Mattiat | 310—9.8 X |
| 2,969,512 | 1/1961 | Jaffe et al. | 310—9.7 X |
| 2,974,296 | 3/1961 | Rosen | 310—9.8 X |
| 3,114,849 | 12/1963 | Poschenrieder | 310—9.6 X |
| 3,165,651 | 1/1965 | Bechmann | 310—9.5 X |
| 3,252,017 | 5/1966 | Bartels | 310—9.8 |
| 3,401,275 | 9/1968 | Curran et al. | 310—8.2 |

MILTON O. HIRSHFIELD, Primary Examiner

M. O. BUDD, Assistant Examiner

U.S. Cl. X.R.

310—9.7, 9.8, 9.6, 9.5; 333—72